US 6,539,899 B1

(12) United States Patent
Piccirilli et al.

(10) Patent No.: US 6,539,899 B1
(45) Date of Patent: Apr. 1, 2003

(54) ROTARY VALVE FOR SINGLE-POINT COOLANT DIVERSION IN ENGINE COOLING SYSTEM

(75) Inventors: Davide F. Piccirilli, Livonia, MI (US); Leonhard Bartsch, Baesweiler (DE); Keith E. Liederman, Brighton, MI (US); Matti K. Vint, Canton, MI (US); Joseph V. Bejster, Dearborn, MI (US); Nicholas P. Harmer, Cheam (GB); Martin Green, Billericay (GB); Mathew E. Haigh, Chelmsford (GB); Ali Jalilevand, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/074,902

(22) Filed: Feb. 11, 2002

(51) Int. Cl.$^7$ .................................................. F01P 7/14
(52) U.S. Cl. ................................... 123/41.1; 123/41.08
(58) Field of Search ............................. 123/41.1, 41.08, 123/41.02

(56) References Cited

U.S. PATENT DOCUMENTS

| | | | | |
|---|---|---|---|---|
| 5,275,231 A | | 1/1994 | Kuze | |
| 5,617,815 A | * | 4/1997 | Spies et al. | 123/41.1 |
| 5,638,775 A | * | 6/1997 | Hollis | 123/41.08 |
| 5,642,691 A | | 7/1997 | Schroeder | |
| 5,699,759 A | * | 12/1997 | Hollis | 123/41.08 |
| 5,724,931 A | * | 3/1998 | Hollis | 123/41.08 |
| 6,109,218 A | * | 8/2000 | Bachschmid et al. | 123/41.08 |
| 6,164,248 A | * | 12/2000 | Lehmann | 123/41.1 |
| 6,199,516 B1 | * | 3/2001 | Katayama | 123/41.1 |
| 6,273,033 B1 | * | 8/2001 | Enander et al. | 123/41.1 |
| 6,289,913 B1 | | 9/2001 | Babin | |
| 6,371,060 B1 | * | 4/2002 | Lehmann et al. | 123/41.1 |

* cited by examiner

Primary Examiner—Tony M. Argenbright
Assistant Examiner—J A Benton
(74) Attorney, Agent, or Firm—MacMillan, Sobanski & Todd, LLC

(57) ABSTRACT

A rotary valve provides single point flow control of coolant within the cooling system of an internal combustion engine. The valve distributes coolant flow from the engine in predetermined flow modes to either 1) the radiator and heater simultaneously, 2) a bypass circuit only, 3) the heater only, or 4) the radiator and bypass simultaneously. The single-point coolant control results in advantages of shorter warm-up times, a lower pressure drop (reducing power consumption by the pump), reduced engine emissions and fuel consumption, improved cabin heater performance, and improved engine durability due to reduced thermal shocks to the engine components by virtue of more precise control of engine operating temperature.

21 Claims, 9 Drawing Sheets

ROTARY VALVE FOR SINGLE-POINT COOLANT DIVERSION IN ENGINE COOLING SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

1. Field of the Invention

The present invention relates in general to automotive cooling systems, and, more specifically, to a multi-port valve for controlling coolant flow to all cooling system components.

2. Description of the Related Art

Conventional cooling systems for internal combustion engines include a water jacket (i.e., passages within the engine block for circulating coolant), a radiator, a fan, a heater core, a water pump, and various hoses and clamps. They also include a thermostat and/or various valves to control the flow of coolant in response to the temperature of the coolant, demand for heating of the passenger compartment, and other factors.

When an engine is first warming up after being started, it is known to have the coolant flow bypass the radiator so that the coolant and engine warm up more quickly. Quicker warming leads to reduced engine emissions, improved fuel economy, and improved engine performance since reaching an optimal engine operating temperature in faster time means less time spent in cold start emissions mitigation strategies. The switching of coolant flow between a bypass circuit and the radiator circuit is conventionally performed by the thermostat. A typical thermostat uses a wax motor to drive a valve between one position in which all coolant is directed through the bypass and none to the radiator and another position in which all coolant is directed through the radiator and none through the bypass. Some thermostats may gradually cutoff bypass flow while radiator flow gradually increases.

Internal combustion engine technology is producing engines of higher efficiency and increasingly sophisticated control methods. This has increased the need for fast warm up times and precise control of engine operating temperatures, which have not been adequately attained with conventional cooling systems. Furthermore, delays in warming up of the engine also delay the availability of heat in the passenger compartment.

Separate from the thermostat, a passive 2-way valve may direct coolant to a heater core when warm air is being demanded in the passenger compartment. Other valves may also be included for either cooling or heating other vehicle components, such as cooling of electronic modules or heating of seats. Achieving these additional functions becomes expensive not only because of the proliferation of valves, but also because of the proliferation of separate actuators and the wiring, cables, or hydraulic or pneumatic (e.g. vacuum) lines required to control them.

SUMMARY OF THE INVENTION

The present invention provides a rotary valve for single point flow control of coolant resulting in advantages of shorter warm-up times, a lower pressure drop (reducing power consumption by the pump), reduced engine emissions and fuel consumption, improved cabin heater performance, and improved engine durability due to reduced thermal shocks to the engine components by virtue of more precise control of engine operating temperature.

In one aspect of the invention, a rotary valve for single-point coolant switching of coolant flowing in an engine cooling system comprises a valve body having an inlet port and a plurality of outlet ports. The outlet ports include a radiator port for allowing coolant flow in a radiator circuit, a bypass port for allowing coolant flow in a bypass circuit, and a heater port for allowing coolant flow in a heater circuit. A flow diverter is rotationally received in the valve body and includes a plurality of fluid passages providing predetermined flow paths between the inlet port and the outlet ports in response to a rotational position of the flow diverter. An actuator responds to a control signal for setting the rotational position. The predetermined flow paths include a first mode for distributing the coolant to the radiator port and the heater port while blocking coolant from the bypass port, a second mode for distributing the coolant to the bypass port while blocking coolant from the radiator port and the heater port, a third mode for distributing the coolant to the heater port while blocking coolant from the radiator port and the bypass port, and a fourth mode for distributing the coolant to the radiator port and the bypass port while blocking coolant from the heater port. In particular, the second mode may include a plurality of selectable flow rates to the bypass port including at least a first flow rate and a second flow rate higher than the first flow rate, wherein the first flow rate provides increased heat flow into the coolant. Thus, contrary to prior art thermostats, the slowest flow rate through the bypass may be achieved at the lowest coolant temperatures during engine startup.

DETAILED DESCRIPTION OF PREFERRED EMBODIMENTS

Figure 1:
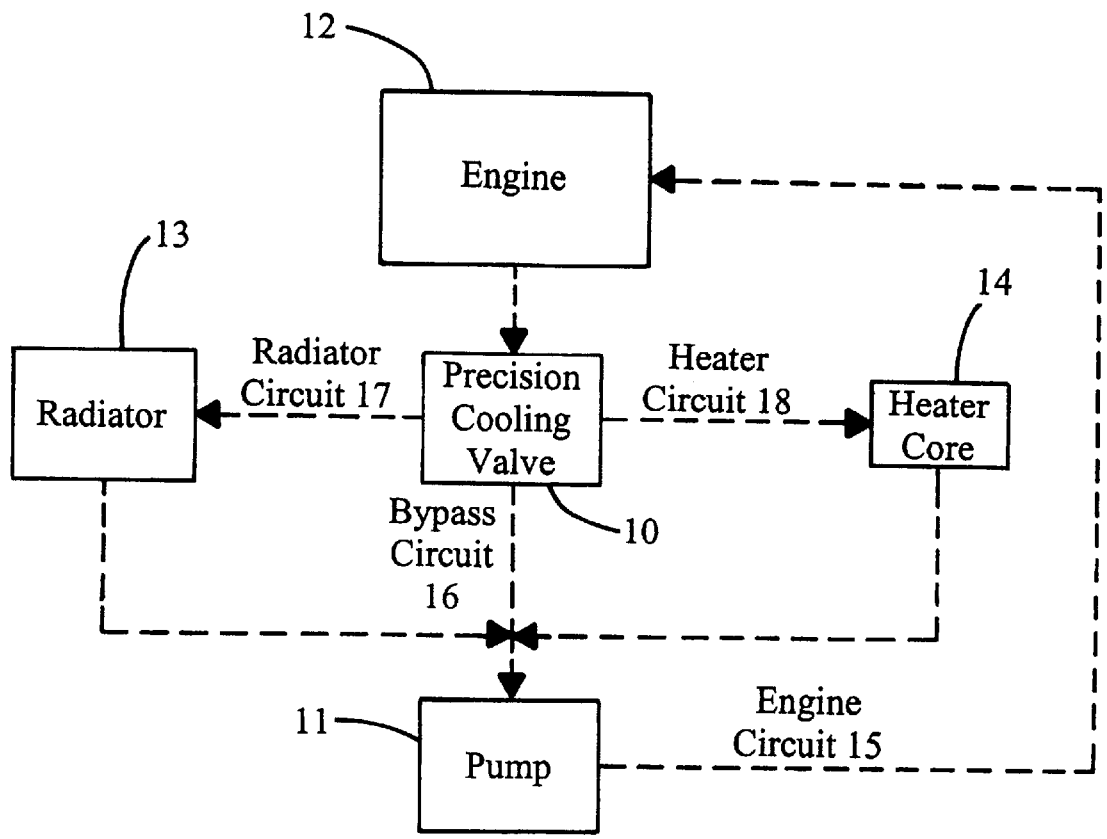
FIG. 1 is a block diagram showing coolant flow of the present invention through a single point precision cooling valve.

Referring to FIG. 1, a preferred embodiment of an internal combustion engine cooling system is shown with single-point coolant distribution using a multi-port precision cooling valve 10. The cooling system further includes a water pump 11, an engine 12 with a water jacket for receiving coolant flow, a radiator 13, and a heater core 14. Water pump 11 forces coolant to flow to engine 12 through an engine circuit 15 to valve 10. Valve 10 distributes the coolant received from engine 12 in selectable proportions or flow rates to 1) a bypass circuit 16 which returns the coolant directly to pump 11 (i.e., bypassing radiator 13), 2) a radiator circuit 17 which passes coolant through radiator 13 to cool the coolant, and 3) a heater circuit 18 which passes coolant through heater core 14 to heat the passenger cabin of a vehicle. Locating valve 10 to receive at its inlet all the coolant from engine 12 facilitates single-point switching of coolant to obtain precise control of engine operating temperature, improved cabin heater performance, and other benefits. However, other overall system configurations are also possible. Furthermore, additional cooling system components such as a de-gas circuit to coolant reservoir or circuits to other auxiliary heat exchangers can be accommodated by additional ports on valve 10.

Figure 2:
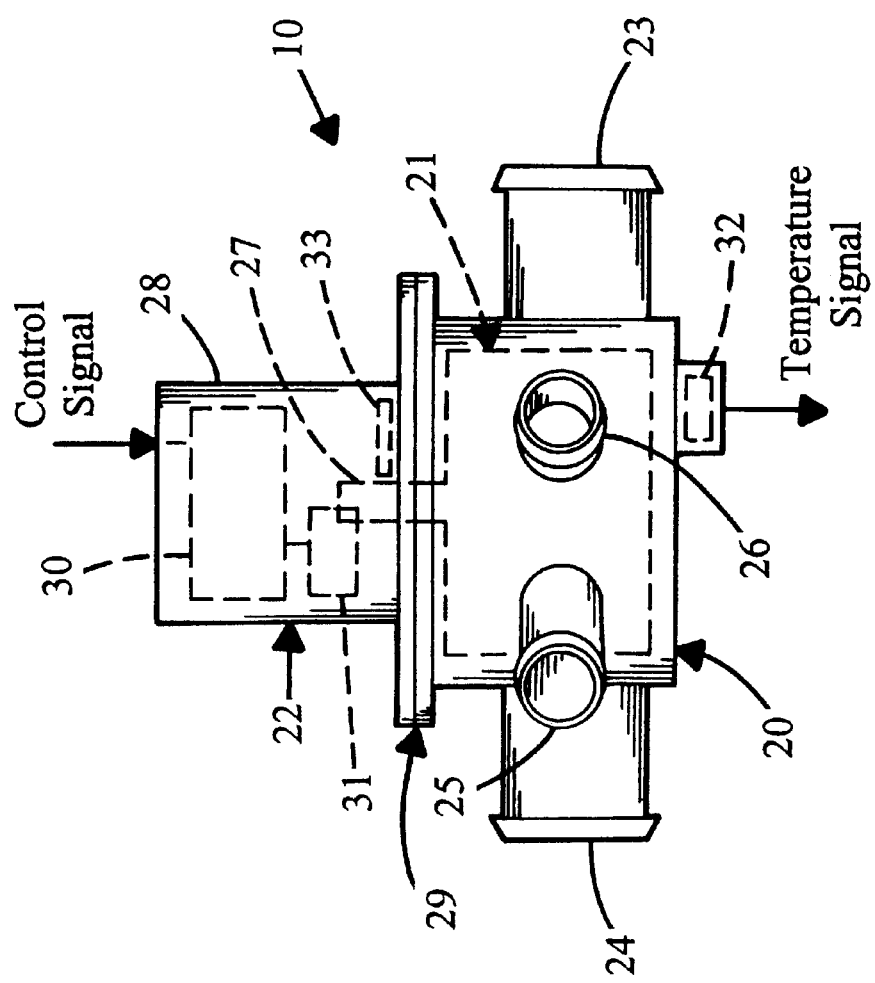
FIG. 2 is a side view of a valve of the present invention.

FIG. 2 shows a first embodiment of multi-port valve 10 comprising a generally cup-shaped valve body 20, a flow diverter 21 received in valve body 20, and an actuator 22 mounted atop valve body 20. Valve body 20 includes an inlet port or fitting 23, a radiator outlet port 24, a bypass outlet port 25, and a heater outlet port 26. Flow diverter 21 is generally cylindrically shaped or barrel shaped and has a plurality of fluid flow passages to provide predetermined flow paths therethrough as described below. A valve stem 27 extends upward from flow diverter 21 by which it is rotated within valve body 20 by actuator 22 to present different flow paths between ports.

Actuator 22 includes a cover 28 for containing a drive unit 30 coupled to valve stem 27 by a drive train or gear box 31. Drive unit 30 receives a control signal for commanding a particular rotational position of flow diverter 21. For example, drive unit 30 may be comprised of an electric motor and control signal an analog or digital command signal representative of the desired angular position of diverter 21. Drive unit 30 could also be hydraulically or pneumatically driven with corresponding hydraulic or pneumatic inputs. The control signal may be derived from a controller (discussed below) based on several input parameters such as coolant temperature, as is known in the art. Thus, valve 10 may further include an electronic temperature sensor 32 within valve body 20 for contacting coolant flowing through the valve.

In the event of failure of drive unit 30 or loss of a control signal, the present invention provides a failsafe mechanism to bias flow diverter 21 into a rotational position where coolant flow is directed to the radiator circuit and to the heater circuit. Thus, a return spring 33 is coupled between cover 28 and valve stem 27 to urge flow diverter 21 into the failsafe position when required. Spring 33 could alternatively be connected between cover 28 and gear box 31.

Matching flanges 29 are provided for joining valve body 20 and cover 28. Sealing gaskets provided at many points throughout the valve and alignment features for maintaining diverter 21 in position are not shown but are within the normal skill in the art.

Figure 3:
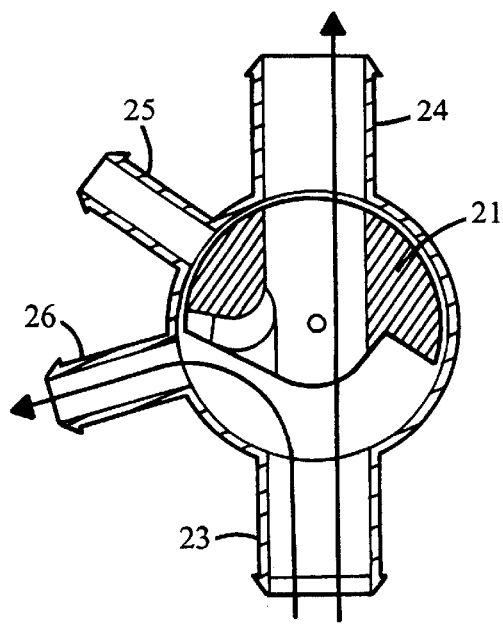
FIGS. 3–6 are top cross-sectional views of the valve of FIG. 2 in various flow modes.

In one preferred embodiment, flow diverter 21 contains fluid passages adapted to provide flow paths through valve 10 in four basic modes achieved at four respective rotational positions. A first mode is a radiator/heater mode as shown in FIG. 3. As seen in the cross section, the flow paths result from fluid passages or channels formed within flow diverter 21 within the plane of the inlet and outlet ports. In FIG. 3, there are open paths for distributing coolant from inlet 23 to radiator port 24 and heater port 26 while coolant flow to bypass port 25 is blocked. The radiator/heater mode shown in FIG. 3 also corresponds to the failsafe position of diverter 21. In this mode, engine warm-up is not optimized but flow to the radiator ensures that the engine is protected from overheating and flow to the heater core ensures that cabin heating is available for defrosting windows or warming the passengers.

Figure 4:
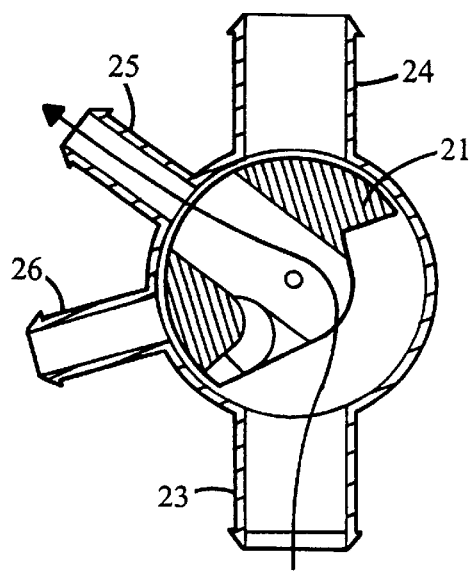

FIG. 4 shows a second mode which is a bypass only mode which is selected when cold coolant temperature below a set point is detected. The only open flow path is between inlet 23 and bypass port 25, and since coolant flow is then restricted to only the engine circuit the engine is warmed in the shortest possible time.

Figure 5:
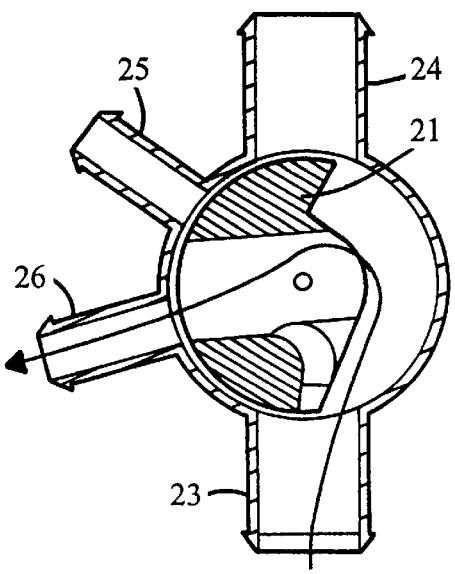

FIG. 5 shows a third mode which is a heater only mode wherein the only open flow path is between inlet port 23 and heater port 26. This mode may be selected, for example, when there is a demand for cabin heat and the current engine operating temperature is above a predetermined minimum threshold but is still below its set operating point temperature.

Figure 6:
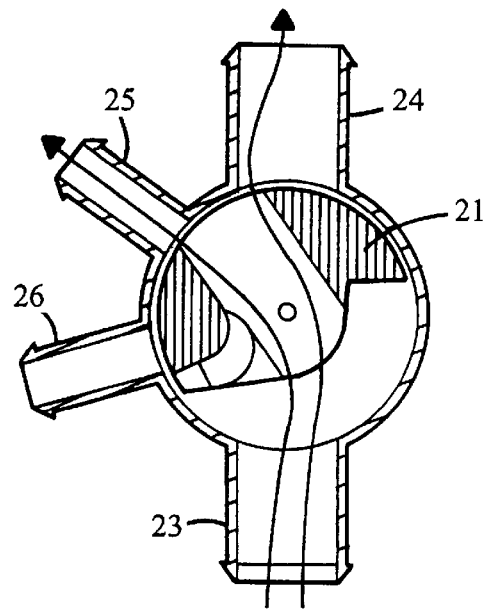

FIG. 6 shows a fourth mode which is a radiator and bypass mode wherein there are open flow paths between the inlet port 23 and both radiator port 24 and bypass port 25. This mode may be used when coolant temperature is near the set point to obtain lower amounts of radiator cooling.

One important advantage of the multi-port valve shown in FIGS. 2–6 is its low pressure drop compared to other valves used in conventional cooling systems. This results in a reduced accessory load placed upon the engine which increases fuel economy.

Using the four modes of FIGS. 3–6, coolant flow can be controlled to meet vehicle cooling requirements as necessary. Flow diverter 21 can also be located in rotational positions between those shown in FIGS. 3–6 to obtain variable flow rates within the several modes.

Figure 7:
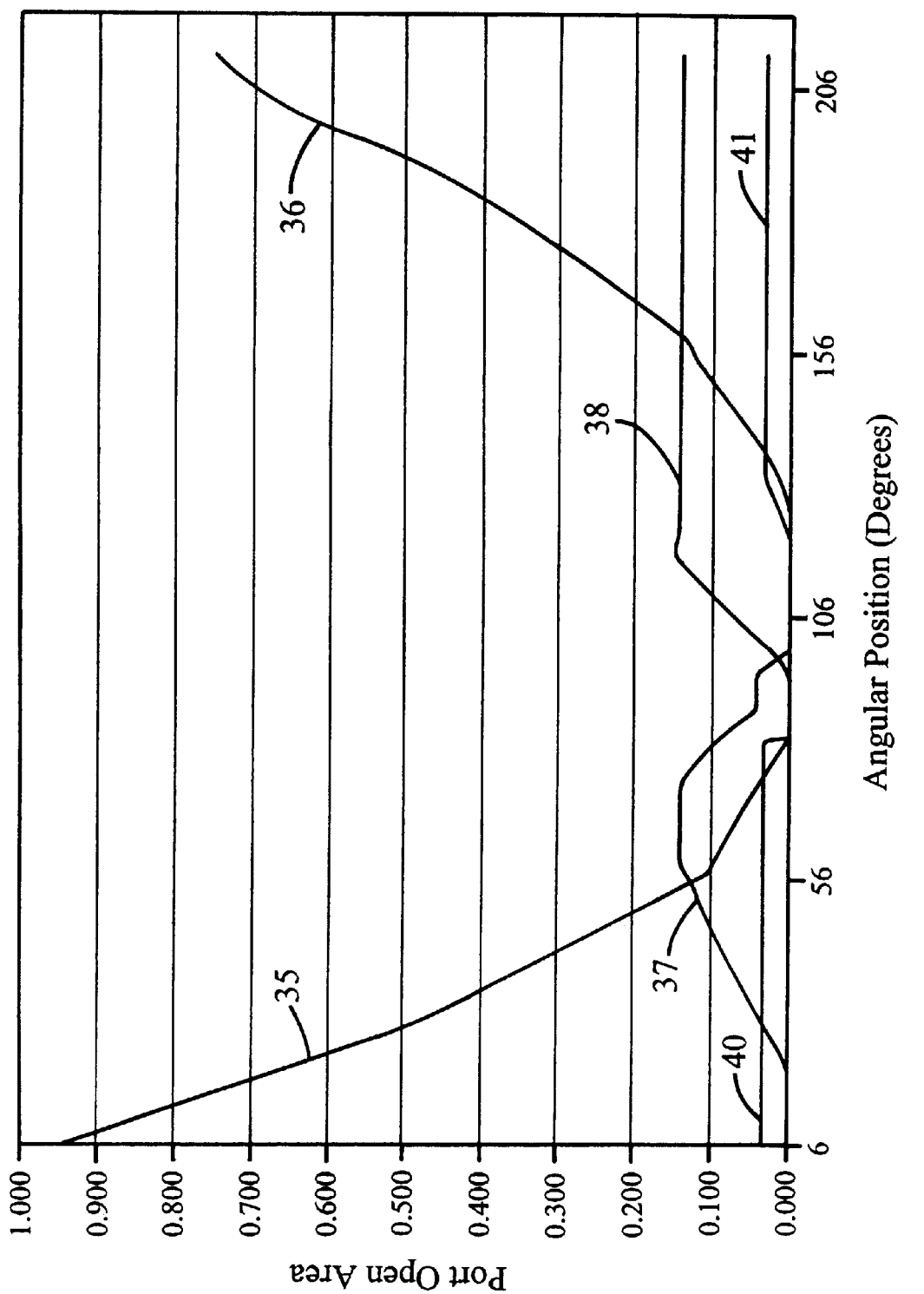
FIG. 7 is a plot showing port open area (i.e., flow restriction) in a further embodiment of precision cooling according to the present invention.

In a further embodiment of the present invention, various flow rate profiles at respective rotational positions of the flow diverter can be specified as shown in FIG. 7. The flow from the inlet port to any particular outlet port is dependent upon the open area of the overlap of a particular fluid passage with the port itself. Thus, by selecting an appropriate geometry for the fluid passages within the flow diverter, any arbitrary flow rate profiles can be obtained (within practical limits).

FIG. 7 illustrates port open area for each port at each respective rotational position of the flow diverter. In this example, the flow diverter can be rotated to angular positions at angles between 6° and 206° from a reference position. Port open area is shown in square inches. A line 35 shows a port open area curve for the radiator port such that radiator flow is at a maximum (about 0.95 $in^2$) at 6° and drops to zero at an angular position of about 83°. Rather than dropping at a constant slope, it can drop at several rates depending upon the fluid passage geometries as shown below. A line 36 shows the open area curve for the radiator port at angular positions from zero open area at about 126° to an open area of about 0.75 in$^2$ at 206°.

A line 37 shows the curve of open port area for the bypass port. The bypass open area gradually increases from zero at 20° to a maximum of about 0.14 in$^2$ at about 59°. Then line 37 drops from 74° to 88° to a value of about 0.04 in$^2$. It maintains this second level of restriction until about 95° and then drops to zero at about 100° angular position.

A line 38 shown the curve of open port area for the heater port. It rises from zero at 95° to a maximum value of 0.14 in$^2$ at about 117° which it maintains through 206°. Also shown are values for a de-gas port line 40 which start at 0.03 in$^2$ at 6° and stays constant until dropping to zero at about 83°. The de-gas port remains cutoff until about 122° and is restored to 0.03 in$^2$ between 132° and 206° as shown by line 41.

A radiator/heater mode of coolant flow can be obtained with rotational positions in the range of about 126° to 206°. The failsafe position preferably corresponds to the angular position of 206° in this embodiment.

The bypass only mode can be obtained in the range of about 88° to 95°. The line 37 provides a plateau in the bypass port open area profile to allow a tolerance band with respect to positioning the diverter to achieve the desired coolant flow. The plateau corresponds to a fluid passage geometry that provides a constant overlapping area with the port over the range of diverter rotation.

The heater only mode can be obtained at rotational positions in the range of about 117° to 127°. The de-gas port in this embodiment may be used to pass the coolant through a de-gas bottle to remove air from the coolant. The radiator and bypass mode can be obtained at rotational positions in the range of about 6° to 74°. In particular, bypass curve 37 has a second plateau between 59° and 74° which provides a greater flow (i.e., lower restriction) than the first plateau in the bypass only mode. The slower (more restricted) flow during the bypass only mode causes a greater amount of heat flow from the engine into the coolant thereby raising the coolant temperature and bringing the engine to equilibrium more quickly. More specifically, the coolant stays in direct contact with the engine longer but still is moving enough to prevent the creation of excessive hot spots. The less restricted (i.e., faster) flow of the second plateau in the radiator/bypass mode is better suited to the desired heat flow when higher operating temperature has been obtained and allows better control of the temperature around the desired set point. Thus, the relative flow achieved in the flow modes of the present invention provides significant improvement over the prior art.

Figure 8:
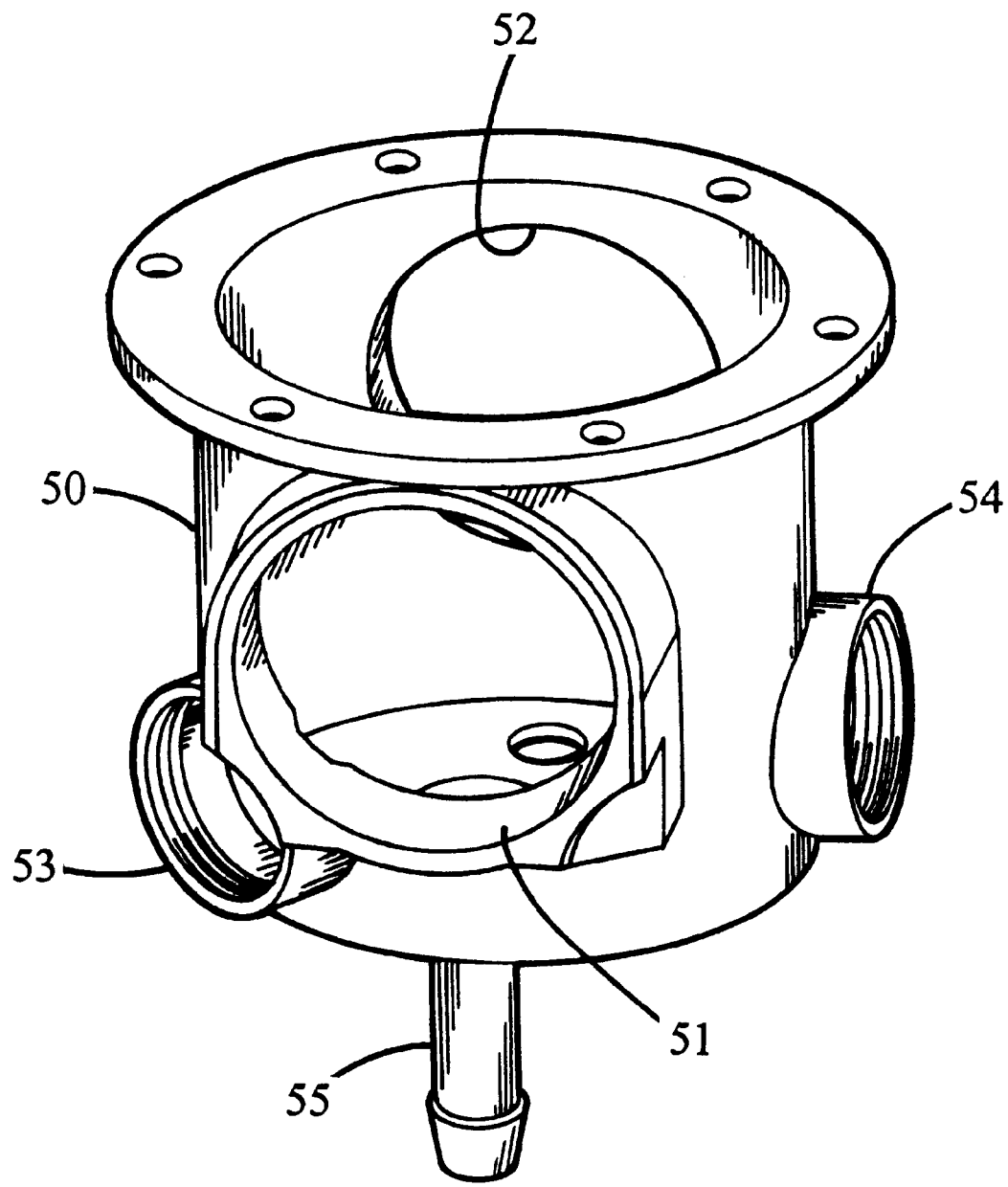
FIG. 8 is a perspective view of a valve body of the further embodiment.

FIG. 8 shows an valve body 50 without hose fittings in an embodiment for achieving the flow profiles of FIG. 7. Body 50 has an inlet port 51, a radiator port 52, a bypass port 53, a heater port 54, and a de-gas or auxiliary port 55. In this embodiment, not all ports are located in the same plane as inlet port 51.

Figure 9:
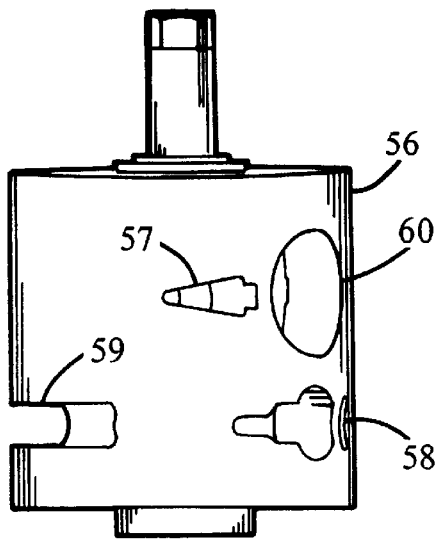
FIG. 9 is a side view of a flow diverter to be received in the valve body of FIG. 8.
Figure 10:
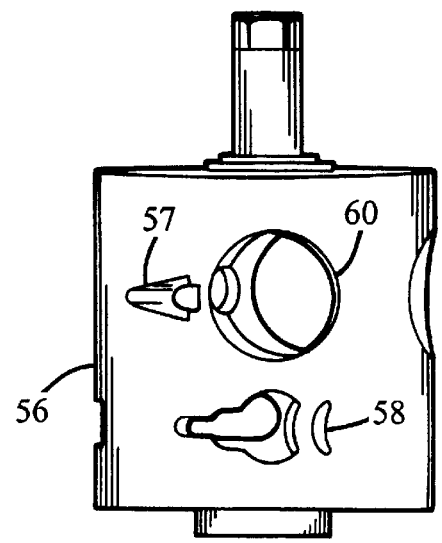
FIG. 10 is a side view of the flow diverter of FIG. 9 viewed at a different rotational position.
Figure 11:
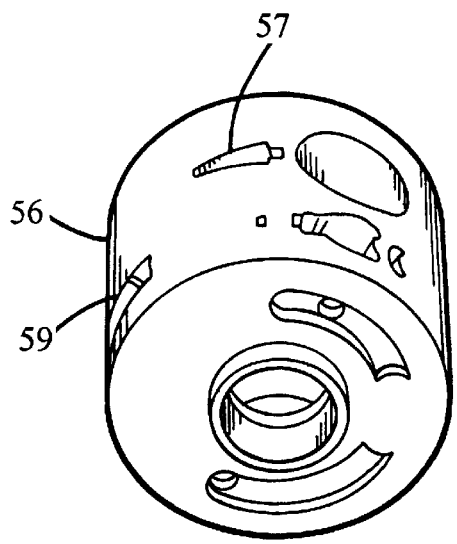
FIG. 11 is a bottom, perspective view of the flow diverter of FIG. 9.

A flow diverter 56 for providing the desired profiles of the open port areas versus angular diverter position is shown in FIGS. 9–11. Fluid passages for overlapping with inlet port 51 lead to interior chambers in diverter 56. Other passages lead to the outlet ports at various rotational positions of the diverter. The outlets of the passages have selected geometries as shown to provide the desired overlapping port areas. Thus, passage openings include a wedge shape as shown at opening 57, and arc shape as shown at opening 58, a slot shape as shown at opening 59, and circle shapes as shown at opening 60.

Figure 12:
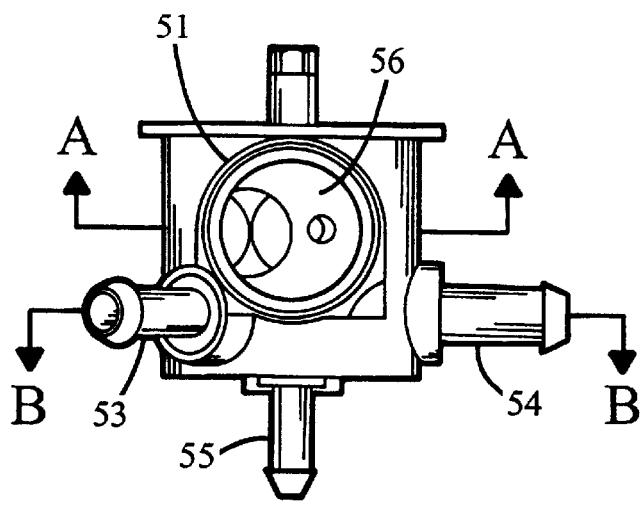
FIG. 12 is a side view of the valve body and flow diverter in a rotational position to provide flow to the radiator and heater.
Figure 13:
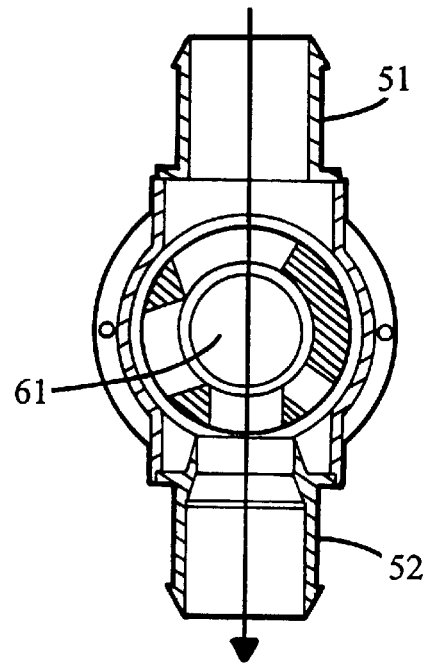
FIG. 13 is a cross-sectional view as indicated by lines A—A in FIG. 12.
Figure 14:
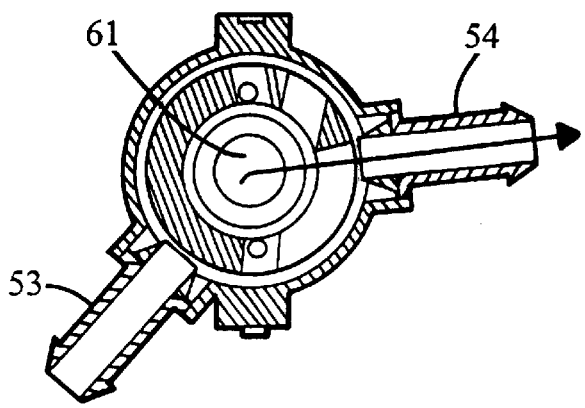
FIG. 14 is a cross-sectional view as indicated by lines B—B in FIG. 12.

FIG. 12 shows diverter 56 placed in valve body 50 in the angular position at 206° which is a failsafe position with flow paths to radiator port 52 and heater port 54 as shown in FIGS. 13 and 14.

Figure 15:
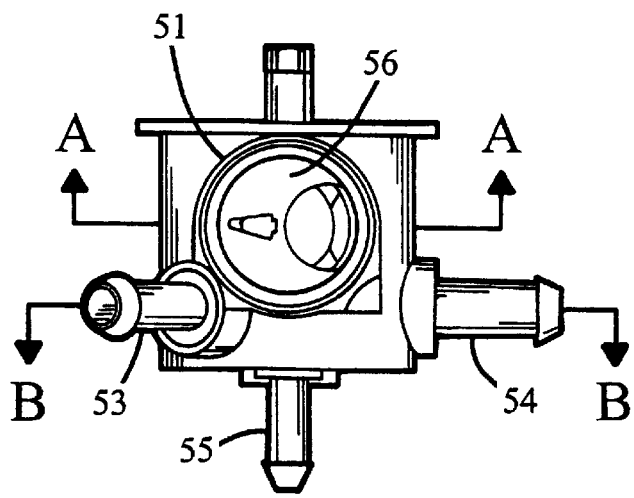
FIG. 15 is a side view of the valve body and flow diverter in a rotational position to provide flow only to the radiator.
Figure 16:
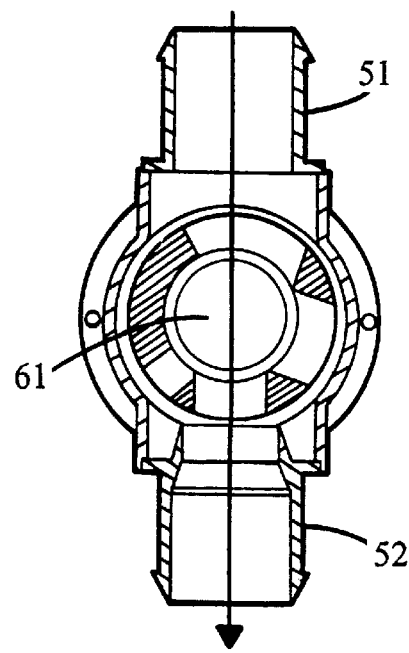
FIG. 16 is a cross-sectional view as indicated by lines A—A in FIG. 12.
Figure 17:
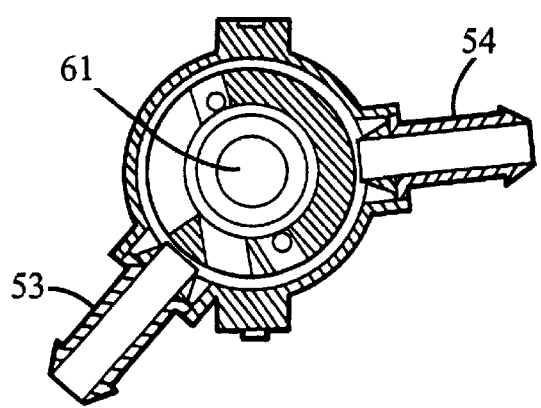
FIG. 17 is a cross-sectional view as indicated by lines B—B in FIG. 12.

FIG. 15 shows diverter 56 placed in valve body 50 in the angular position at 6°. A flow path is provided to radiator port 52 as shown in FIGS. 16 and flow is cutoff to bypass port 53 and heater port 54 as shown in FIG. 17. It can be seen that with clockwise rotation from 6° that flow will begin into bypass port 53 according to the profiles shown in FIG. 7.

Figure 18:
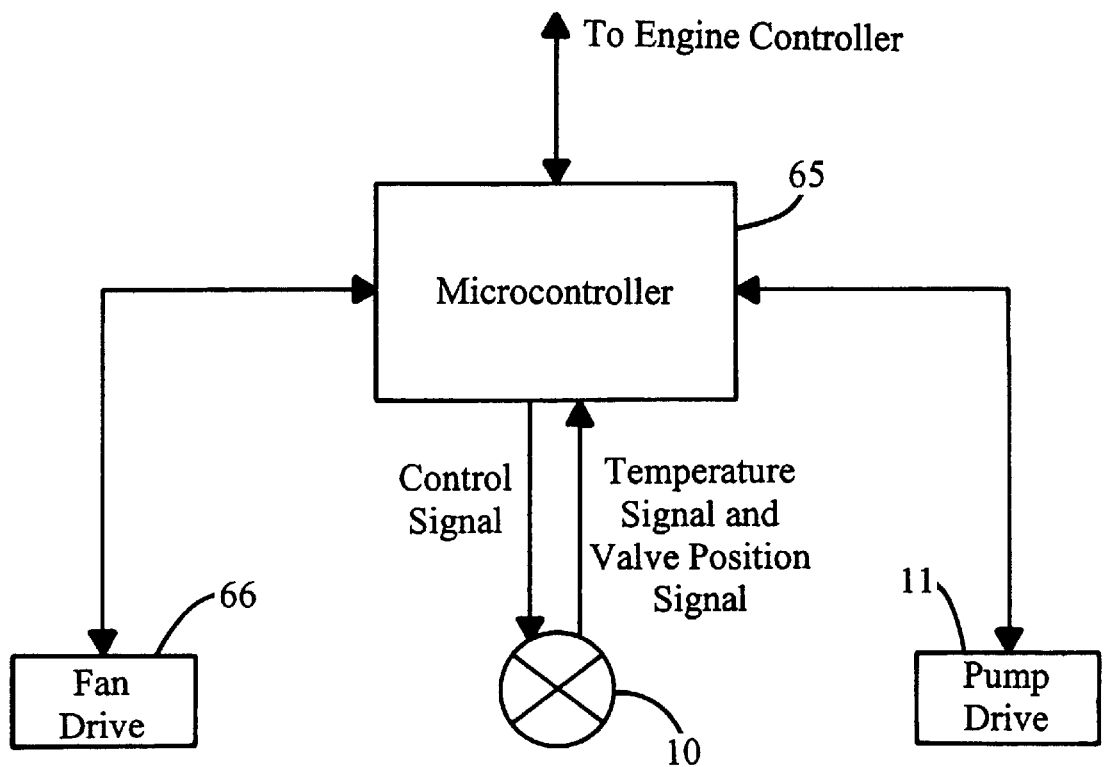
FIG. 18 is a block diagram showing an overall cooling system controller.

FIG. 18 shows control of the precision cooling system wherein a microcontroller 65 controls multi-port valve 10, pump 11, and a fan drive 66 according to a cooling strategy customized for a particular vehicle. The angular position of the diverter in valve 10 is set according to the control signal provided from microcontroller 65 to valve 10. The desired angular position is determined in response to a temperature signal received from valve 10 and other vehicle parameters, such as engine speed obtained from a communication link with an engine controller. Microcontroller 65 can be contained in a stand-alone module or could alternatively be placed in the same module as the engine controller or even be implemented in the same microcontroller as the one performing engine control functions.

What is claimed is:

1. A rotary valve for single-point coolant switching of coolant flowing in an engine cooling system, comprising:

a valve body having an inlet port and a plurality of outlet ports, said outlet ports including a radiator port for allowing coolant flow in a radiator circuit, a bypass port for allowing coolant flow in a bypass circuit, and a heater port for allowing coolant flow in a heater circuit;

a flow diverter rotationally received in said valve body and including a plurality of fluid passages providing predetermined flow paths between said inlet port and said outlet ports in response to a rotational position of said flow diverter; and an actuator responsive to a control signal for setting said rotational position;

wherein said predetermined flow paths include a first mode for distributing said coolant to said radiator port and said heater port while blocking coolant from said bypass port, a second mode for distributing said coolant to said bypass port while blocking coolant from said radiator port and said heater port, a third mode for distributing said coolant to said heater port while blocking coolant from said radiator port and said bypass port, and a fourth mode for distributing said coolant to said radiator port and said bypass port while blocking coolant from said heater port; and wherein said first mode corresponds to a failsafe position for said flow diverter if said actuator fails, said rotary valve further comprising a return mechanism for biasing said flow diverter to said failsafe position.

2. The rotary valve of claim 1 wherein a flow rate of coolant distributed to an outlet port in at least one of said modes is proportional to a variable overlapping cross-sectional area of a respective fluid passage and said outlet port.

3. The rotary valve of claim 2 wherein said flow rate to a particular outlet port receiving coolant flow in a particular mode is variable in response to respective rotational positions within said particular mode.

4. The rotary valve of claim 2 wherein a flow rate to said bypass port in said fourth mode is greater than a flow rate to said bypass port in said second mode to provide greater heat flow into said coolant in said second mode.

5. An engine cooling system for a vehicle, said cooling system distributing heat from an engine using a coolant, said cooling system comprising:
- a pump for circulating said coolant;
- an engine circuit for conducting said coolant through said engine;
- a radiator circuit for conducting said coolant through a radiator;
- a bypass circuit for returning said coolant to said engine circuit without passing through said radiator circuit;
- a heater circuit for conducting said coolant through a heater core;
- a rotary valve for single-point coolant switching of said coolant, said rotary valve comprising:
  - a valve body having an inlet port and a plurality of outlet ports, said outlet ports including a radiator port for allowing coolant flow in said radiator circuit, a bypass port for allowing coolant flow in said bypass circuit, and a heater port for allowing coolant flow in said heater circuit;
  - a flow diverter rotationally received in said valve body and including a plurality of fluid passages providing predetermined flow paths between said inlet port and said outlet ports in response to a rotational position of said flow diverter; and
  - an actuator responsive to a control signal for setting said rotational position;
  - wherein said predetermined flow paths include a first mode for distributing said coolant to said radiator port and said heater port while blocking coolant from said bypass port, a second mode for distributing said coolant to said bypass port while blocking coolant from said radiator port and said heater port, a third mode for distributing said coolant to said heater port while blocking coolant from said radiator port and said bypass port, and a fourth mode for distributing said coolant to said radiator port and said bypass port while blocking coolant from said heater port; and
  - wherein said first mode corresponds to a failsafe position for said flow diverter if said actuator fails, said rotary valve further comprising a return mechanism for biasing said flow diverter to said failsafe position; and
- a controller responsive to predetermined vehicle parameters for generating said control signal to select one of said modes in response to said predetermined vehicle parameters.

6. The cooling system of claim 5 wherein a flow rate of coolant distributed to an outlet port in at least one of said modes is proportional to a variable overlapping cross-sectional area of a respective fluid passage and said outlet port.

7. The cooling system of claim 6 wherein said flow rate to a particular outlet port receiving coolant flow in a particular mode is variable in response to respective rotational positions within said particular mode.

8. The cooling system of claim 6 wherein a flow rate to said bypass port in said fourth mode is greater than a flow rate to said bypass port in said second mode to provide greater heat flow into said coolant in said second mode.

9. A rotary valve for single-point coolant switching of coolant flowing in an engine cooling system, comprising:
- a valve body having an inlet port and a plurality of outlet ports, said outlet ports including a radiator port for allowing coolant flow in a radiator circuit and a bypass port for allowing coolant flow in a bypass circuit;
- a flow diverter rotationally received in said valve body and including a plurality of fluid passages providing predetermined flow paths between said inlet port and said outlet ports in response to a rotational position of said flow diverter; and
- an actuator responsive to a control signal for setting said rotational position;
- wherein said fluid passages provide a first range of said rotational positions of said flow diverter in a first mode of said rotary valve for distributing said coolant from said inlet port to said bypass port while blocking coolant distribution to said radiator port and provide a second range of said rotational positions of said flow diverter in a second mode of said rotary valve for distributing said coolant from said inlet port to both said bypass port and said radiator port, and wherein at least one selected one of said fluid passages and said bypass outlet have a variable overlapping cross-sectional area between said first and second modes to provide a plurality of selectable flow rates to said bypass port including at least a first flow rate in said first mode and a second flow rate higher than said first flow rate in said second mode, wherein said first flow rate provides increased heat flow into said coolant.

10. The rotary valve of claim 9 wherein said overlapping cross-sectional areas in said first and second ranges provide respective first and second plateaus, each plateau providing a respective constant overlapping cross-sectional area within respective subranges of rotational positions.

11. The rotary valve of claim 9 wherein said overlapping cross-sectional areas provide a sloped variance within at least a portion of said first and second ranges of rotational positions.

12. The rotary valve of claim 9 wherein said actuator is comprised of an electric motor and drivetrain coupled to said flow diverter.

13. An engine cooling system for a vehicle, said cooling system distributing heat from an engine using a coolant, said cooling system comprising:
- a pump for circulating said coolant;
- an engine circuit for conducting said coolant through said engine;
- a radiator circuit for conducting said coolant through a radiator;
- a bypass circuit for returning said coolant to said engine circuit without passing through said radiator circuit;
- a rotary valve for single-point coolant switching of said coolant, said rotary valve comprising:
  - a valve body having an inlet port and a plurality of outlet ports, said outlet ports including a radiator port for allowing coolant flow in said radiator circuit and a bypass port for allowing coolant flow in said bypass circuit;
  - a flow diverter rotationally received in said valve body and including a plurality of fluid passages providing predetermined flow paths between said inlet port and said outlet ports in response to a rotational position of said flow diverter; and
  - an actuator responsive to a control signal for setting said rotational position;
  - wherein said fluid passages provide a first range of said rotational positions of said flow diverter in a first mode of said rotary valve for distributing said coolant from said inlet port to said bypass port while blocking coolant distribution to said radiator port and provide a second range of said rotational positions of said flow diverter in a second mode of said rotary valve for distributing said coolant from said inlet port to both said bypass port and said radiator port, and wherein at least one selected one of said fluid passages and said bypass outlet have a variable overlapping cross-sectional area between said first and second modes to provide a plurality of selectable flow rates to said bypass port including at least a first flow rate in said first mode and a second flow rate higher than said first flow rate in said second mode, wherein said first flow rate provides increased heat flow into said coolant; and a controller responsive to predetermined vehicle parameters for generating said control signal to select one of said modes in response to said predetermined vehicle parameters.

14. The cooling system of claim 13 wherein said overlapping cross-sectional areas in said first and second ranges provide respective first and second plateaus, each plateau providing a respective constant overlapping cross-sectional area within respective subranges of rotational positions.

15. The cooling system of claim 13 wherein said overlapping cross-sectional areas provide a sloped variance within at least a portion of said first and second ranges of rotational positions.

16. The cooling system of claim 13 wherein said first mode is selected by said controller when said engine is initially started and warming up to a desired operating temperature.

17. The cooling system of claim 13 wherein said second mode is selected by said controller when said engine has reached a desired operating temperature.

18. A method of circulating coolant in a cooling system for an internal combustion engine, said cooling system including a pump for circulating said coolant, an engine circuit for conducting said coolant through said engine, a radiator circuit for conducting said coolant through a radiator, and a bypass circuit for returning said coolant to said engine circuit without passing through said radiator circuit, said method comprising the steps of:

starting said engine;

circulating said coolant through said bypass circuit at a first rate and substantially preventing circulation through said radiator circuit during an initial period; and circulating said coolant through said bypass circuit at a second rate while circulating said coolant through said radiator circuit during a subsequent period, wherein said second rate is greater than said first rate and said first rate provides increased heat flow into said coolant from said engine.

19. A rotary valve for single-point coolant switching of coolant flowing in an engine cooling system, comprising:

a valve body having an inlet port and a plurality of outlet ports, said outlet ports including a radiator port for allowing coolant flow in a radiator circuit, a bypass port for allowing coolant flow in a bypass circuit, and a heater port for allowing coolant flow in a heater circuit;

a flow diverter rotationally received in said valve body and including a plurality of fluid passages providing predetermined flow paths between said inlet port and said outlet ports in response to a rotational position of said flow diverter; and an actuator responsive to a control signal for setting said rotational position;

wherein said predetermined flow paths include a first mode for distributing said coolant to said radiator port and said heater port while blocking coolant from said bypass port, a second mode for distributing said coolant to said bypass port while blocking coolant from said radiator port and said heater port, a third mode for distributing said coolant to said heater port while blocking coolant from said radiator port and said bypass port, and a fourth mode for distributing said coolant to said radiator port and said bypass port while blocking coolant from said heater port;

wherein a flow rate of coolant distributed to an outlet port in at least one of said modes is proportional to a variable overlapping cross-sectional area of a respective fluid passage and said outlet port; and wherein a flow rate to said bypass port in said fourth mode is greater than a flow rate to said bypass port in said second mode to provide greater heat flow into said coolant in said second mode.

20. An engine cooling system for a vehicle, said cooling system distributing heat from an engine using a coolant, said cooling system comprising:

a pump for circulating said coolant;

an engine circuit for conducting said coolant through said engine;

a radiator circuit for conducting said coolant through a radiator;

a bypass circuit for returning said coolant to said engine circuit without passing through said radiator circuit;

a heater circuit for conducting said coolant through a heater core;

a rotary valve for single-point coolant switching of said coolant, said rotary valve comprising:

a valve body having an inlet port and a plurality of outlet ports, said outlet ports including a radiator port for allowing coolant flow in said radiator circuit, a bypass port for allowing coolant flow in said bypass circuit, and a heater port for allowing coolant flow in said heater circuit;

a flow diverter rotationally received in said valve body and including a plurality of fluid passages providing predetermined flow paths between said inlet port and said outlet ports in response to a rotational position of said flow diverter; and an actuator responsive to a control signal for setting said rotational position;

wherein said predetermined flow paths include a first mode for distributing said coolant to said radiator port and said heater port while blocking coolant from said bypass port, a second mode for distributing said coolant to said bypass port while blocking coolant from said radiator port and said heater port, a third mode for distributing said coolant to said heater port while blocking coolant from said radiator port and said bypass port, and a fourth mode for distributing said coolant to said radiator port and said bypass port while blocking coolant from said heater port;

wherein a flow rate of coolant distributed to an outlet port in at least one of said modes is proportional to a variable overlapping cross-sectional area of a respective fluid passage and said outlet port; and wherein a flow rate to said bypass port in said fourth mode is greater than a flow rate to said bypass port in said second mode to provide greater heat flow into said coolant in said second mode; and a controller responsive to predetermined vehicle parameters for generating said control signal to select one of said modes in response to said predetermined vehicle parameters.

21. A rotary valve for single-point coolant switching of coolant flowing in an engine cooling system, comprising:

a valve body having an inlet port and a plurality of outlet ports, said outlet ports including a radiator port for allowing coolant flow in a radiator circuit, a bypass port for allowing coolant flow in a bypass circuit, and a heater port for allowing coolant flow in a heater circuit;

a flow diverter rotationally received in said valve body and including a plurality of fluid passages providing predetermined flow paths between said inlet port and said outlet ports in response to a rotational position of said flow diverter; and an actuator responsive to a control signal for setting said rotational position;

wherein said predetermined flow paths include a first mode for distributing said coolant to said radiator port and said heater port while blocking coolant from said bypass port, a second mode for distributing said coolant to said bypass port while blocking coolant from said radiator port and said heater port, a third mode for distributing said coolant to said heater port while blocking coolant from said radiator port and said bypass port, and a fourth mode for distributing said coolant to said radiator port and said bypass port while blocking coolant from said heater port; and wherein a flow rate of coolant distributed to each outlet port in each of said modes is proportional to a variable overlapping cross-sectional area of a respective fluid passage and each respective outlet port, at least one of said fluid passages having an outlet profile such that its respective overlapping cross sectional area with a respective outlet port changes at a rate unequal to a rate at which an overlapping cross sectional area of a different fluid passage and a different outlet port simultaneously change, whereby flow rates provided to different output ports are independently controlled.

\* \* \* \* \*